3,733,330
BENZOMORPHAN DERIVATIVES
Hans-Werner Schubert and Friedrich Hoffmeister, Wuppertal-Elberfeld, Germany, assignors to Bayer Aktiengesellschaft, Leverkusen, Germany
No Drawing. Filed May 14, 1970, Ser. No. 37,331
Claims priority, application Germany, May 17, 1969,
P 19 25 296.1
Int. Cl. C07d 39/00
U.S. Cl. 260—293.54  9 Claims

ABSTRACT OF THE DISCLOSURE

Benzomorphanes of the formula:

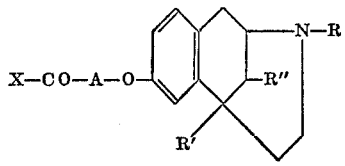

wherein

R is methyl, cyclopropylmethyl or cyclobutylmethyl;
R' and R" are the same or different, and are straight or branched chain hydrocarbons of 1 to 5 carbon atoms;
X is OH, OR''' or

wherein

R''' is a straight or branched chain, saturated or unsaturated hydrocarbon of 11 to 11 carbon atoms;
$R^4$ and $R^5$ are the same or different, and are hydrogen, a straight or branched chain, saturated hydrocarbon of 1 to 4 carbon atoms, or $R^4$ and $R^5$ together with the nitrogen atom form a 5- or 6-membered heterocyclic ring which may have oxygen as a second heteroatom; and as a second heteroatom; and
A is a bivalent, straight or branched chain, saturated or unsaturated hydrocarbon of 1 to 10 carbon atoms, said hydrocarbon substituted by 1 or more phenyl moieties, or said hydrocarbon substituted by 1 or more alkyl, alkoxy, halogen, nitro or acylamino substituted phenyl moieties, and pharmaceutically acceptable non-toxic salts thereof are produced by reacting a benzomorphan of the formula:

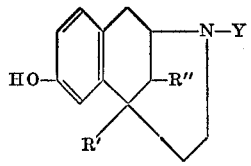

wherein

R' and R" are as above defined, and
Y is hydrogen, methyl, cyclopropylmethyl, cyclobutylmethyl, or the moiety —CO—$R^6$, wherein $R^6$ is cyclopropyl or cyclobutyl, in the presence of an acid-binding agent, or by reacting said benzomorphan in the form of a metal or ammonium salt with a reactive ester of a hydroxy compound of the formula:

Z—A—OH wherein

A is as above defined, and
Z is CO—X or CN to give a compound of the formula.

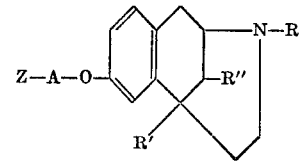

wherein

R, R', R", A and Z are as above defined, and in the case where Z is CN, converting this group into the corresponding CO—H group and if Y is hydrogen or —CO—$R^6$, converting said hydrogen or said moiety into a methyl, cyclopropylmethyl or cyclobutylmethyl moiety.

The benzomorphanes are useful as analgesics.

---

The present invention is concerned with benzomorphanes and their production. These compounds are useful as analgesics.

It is known that the so-called strongly active or "narcotic analgesics" exhibit similar pharmacological effects to that of morphine independent of their chemical composition. As a result, such compounds cause similar concomitant effects and side-effects as morphine itself and at a high dosage level produce similar toxic phenomena as does morphine. Thus, the morphine-like effect of such compounds which produces morphine-like physiological and psychic dependents in humans and animals, commonly known as morphine addiction, is of great significance.

As a result of these effects, analgesics like morphine and those which exhibit morphine-like effects are only used under closely supervised circumstances in order to minimize the possibility of morphine addiction. Because of the likelihood of morphine addiction, such compounds cannot be used for long term pain relief. Thus, any new analgesic which exhibits a high activity level and at the same time either does not produce a morphine-like addition or dependence, or produces an addiction or dependence which is less pronounced than morphine and the morphine-like analgesics represents a significant and important advance in the art.

Clincial-therapeutic experience has demonstrated that the analgesic effect of known strongly active analgesics is not always suffcient for the treatment of conditions which produce severe pain, such as the pain associated with carcinoma. In such cases, the analgesic effectiveness will outweight the additive side-effects so that analgesics which are stronger than morphine and morphine-like analgesics would be of considerable and important usage even though such compounds might cause addiction.

It is well known in the art that both the analegsic effects and the side-effects or concomitant effects of analgesics can be accurately determined in animal experiments. The analgesic effects are particularly reliably detected in the heat ray test on the tail of a rat, according to d'Amour and Smith.

The concomitant effects and especially the addiction causing properties of analgesics can be determined by testing such compound on morphine-dependent monkeys, i.e., monkeys addicted to morphine.

Compounds which are tested on morphine-dependent monkeys and which either are not capable of replacing morphine or which exert a morphine antagonist effect in such monkeys are considered to be free of morphine addiction and dependence type properties.

The benzomorphanes of the present invention exhibit a high level of analgesic activity and are superior to such known strong anaglesics as morphine, codeine and pethidine. The benzomorphanes of the present invention are superior to these known analgesics either by virtue of a strong analgesic activity, better toleration, or both. In addition, many of the compounds of the present invention have been shown to be free of properties which cause addiction based on recognized animal experiments, or exhibit such properties only to a slight extent. Some of the compounds of the present invention also have shown usefulness in the treatment of manic-depressive illness in humans.

The benzomorphanes of the present invention are represented by the formula:

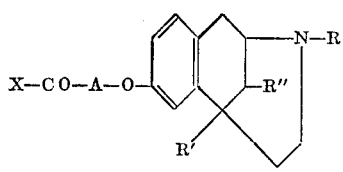

(I)

wherein

R is methyl, cyclopropylmethyl or cyclobutylmethyl;
R' and R" are the same or different, and are a straight or branched chain saturated hydrocarbon of 1 to 5 carbon atoms, especially alkyl of 1 to 5 carbon atoms;
X is OH, OR''' or

wherein

R''' is a straight or branched chain, saturated or unsaturated hydrocarbon of 1 to 11 carbon atoms, especially straight or branched chain alkyl of 1 to 11 carbon atoms or straight or branched chain alkenyl of 2 to 11 carbon atoms;
$R^4$ and $R^5$ are the same or different, and are hydrogen, or a straight or branched chain saturated hydrocarbon of 1 to 4 carbon atoms, especially alkyl of 1 to 4 carbon atoms, or $R^4$ and $R^5$ together with the nitrogen atom form a 5- or 6-membered heterocyclic ring wherein the nitrogen atom is the only heteroatom or wherein oxygen is present as a second heteroatom, such as pyrrolidine, piperidine or morpholine; and
A is a bivalent, straight or branched chain, saturated or unsaturated hydrocarbon of 1 to 10 carbon atom (i.e. alkylene or alkylidene), a bivalent straight or branched chain, saturated or unsaturated hydrocarbon of 1 to 10 carbon atoms substituted by a member selected from the group consisting of 1 phenyl group, more than 1 phenyl group, and 1 or more phenyls substituted by alkyl, alkoxy, halogen, nitro or acylamino. In particular, it is preferred that A is alkyl of 1 to 10 carbon atoms, alkylene of 1 to 10 carbon atoms, alkenyl of 2 to 10 carbon atoms, or said alkyl, said alkylene, or said alkenyl substituted by phenyl.

These benzomorphanes are produced by reacting a benzomorphan of the formula:

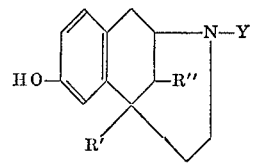

(II)

wherein

R' and R" are as above defined, and
Y is hydrogen, methyl, cyclopropylmethyl, cyclobutylmethyl, or a moiety of the formula:

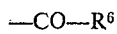

wherein $R^6$ is cyclopropyl or cyclobutyl, in the presence of an acid-binding agent, such as potassium carbonate, sodium hydroxide and the like, or by reacting a metal or ammonium salt of compound II with a reactive ester of a hydroxyl compound of the Formula III, for example halides or tosylates,

(III)

wherein

A is as above defined, and
Z is CO—X or CN wherein

X is as above defined, to give a compound of the Formula IV:

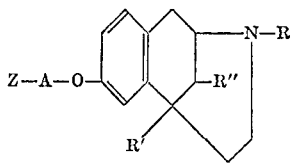

(IV)

wherein

R, R', R", A and Z are above defined, and in the case where Z is CN, converting this group according to methods per se known into the group CO—X and furthermore if Y is hydrogen or the moiety —CO—$R^6$, converting Y into methyl, cyclopropylmethyl or cyclobutylmethyl by a subsequent reaction according to methods which are per se known to obtain compounds of the Formula I. The compounds of the Formula I may be converted into pharmaceutically acceptable non-toxic salts by reaction with suitable acids.

The benzomorphanes of the Formula II can be obtained according to the process of British Pat. No. 1,078,286, according to U.S. Pat. No. 3,138,603, or according to J. Med. Chem. 7, 123 (1964).

The reaction above described may be carried out in an aqueous medium or in organic solvents, such as benzene, tetrahydrofurane, acetone, dimetyhlformamide, and the like, at room temperatures or at elevated temperatures. Generally, the boiling point of the particular solvent selected is chosen.

In the case where Z is CO—X, the compounds of Formula IV are identical to the compounds of Formula I. If Z is CN, then the compounds IV must be converted as above indicated to the compounds of Formula I.

Among the methods for conversion which can be employed include the conversion into esters (X=OR''') and carboxylic acids (X=OH) via imino-ethers, or acid or alkaline hydrolysis, which leads to the primary acid amides

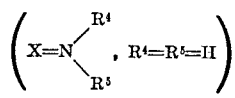

or to carboxylic acids (X=OH).

In the case of the reaction of II with reactive esters of hydroxycarboxylic acids (X=OH) it is preferable to employ these in the form of their alkali salts.

It is also to be appreciated that the compounds of Formula I can be converted into one another according to methods which are per se known. Thus it is for example possible to pass from the carboxylic acids (X=OH) by direct esterification of one of the corresponding acid halides to the esters (X=OR'''), or by reaction of the acid halides with ammonia, primary or secondary aliphatic amines to the acid amides

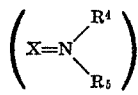

The carboxylic acid esters (X=OR''') can be converted by hydrolysis into the carboxylic acid (X=OH) or by reaction with ammonia primary or secondary aliphatic amines to the acid amides

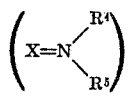

and the acid amides can be converted into carboxylic acids by hydrolysis.

The possible conversions indicated above will be explained by the following scheme of formulae:

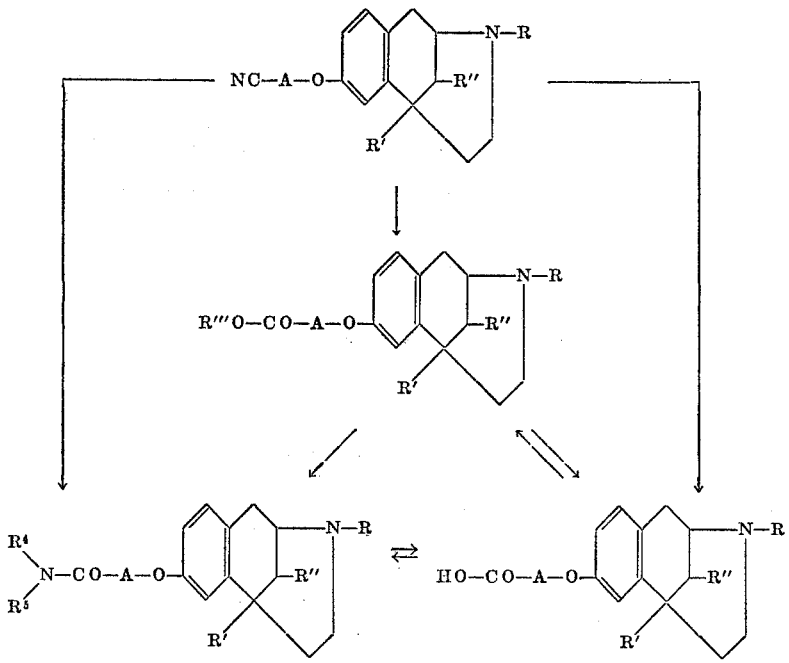

The benzomorphanes of the present invention can be administered either per se or in the form of their salts, or either the compounds per se or their salts may be formulated into pharmaceutical compositions by techniques per se known by combining the benzomorphan, or the salt thereof, with a pharmaceutically acceptable non-toxic inert diluent or carrier. Among the preferred salts include the sodium and potassium salts in the case of the carboxylic acids, as well as the hydrochlorides, sulphates, phosphates and the like. The liberation of the aminoacids, amino-acid-esters and aminoacid-amides on which the salts are based, as well as the conversion of these compounds into their salts, is a reaction which proceeds according to known procedure. Other pharmaceutically acceptable non-toxic salts include the alkali salts, the tartrates, citrates, fumarates, maleates, naphthalene-disulphonates, and the like which are known to be useful for human therapy.

Suitable forms for administering the compounds of the present invention and the pharmaceutical compositions thereof are oral, for example tablets, dragees, capsules and the like, or by injection by the formation of an injectable solution according to methods which are per se known.

While the amount of the benzomorphanes of the present invention will vary depending upon the severity of the pain, the history of the patient, and the strength of the particular benzomorphan, i.e. its level of analgesic activity, the benzomorphanes of the present invention will generally be administered in individual dosages of about 1 to 100 mg., parenterally or enterally. Such dosages may be administered up to four times per day.

Results of pharmacological investigations

In Table 1 set forth below, compounds according to the present invention were compared to known analgesics which cause addiction such as morphine, codeine and pethidine. In Table 2, the structural formulae of representative compounds according to the present invention are designated by number.

Turning to Table 1, this table presents a comparison of the analgesic activity and the compatibility of compounds according to the present invention as compared to known addiction causing analgesics, such as morphine, codeine and pethidine. The toxicity ($LD_{50}$) was determined in rats on subcutaneous administration and the analgesic effect was determined in the heat ray test on the tail of a rat. The therapeutic index ($LD_{50}:ED_{50}$) was calculated from the two values obtained in these investigations.

A test was further carried out as to whether the products of the process can replace morphine in morphine-dependent monkeys or whether morphine-antagonistic effects are present.

As can be seen from Table 1, compounds 1 and 2 have at least as high a therapeutic index as pethidine. Compound 1 only replaces morphine in morphine-dependent monkeys in considerably higher doses than morphine, codeine and pethidine, while compound 2 does not replace morphine at all in these animals in tolerated doses.

Compound 3 also does not replace morphine in morphine-dependent monkeys and furthermore exhibits a higher level of analgesic activity and has a higher therapeutic index than any of the comparison compounds.

Compounds 4, 5, 6, 7, 8, 9 and 10 also only cancel the withdrawal symptoms of morphine-dependent monkeys at higher doses than the comparison products. Compounds 8 and 10 exhibit about the same level of analgesic activity as morphine. Both substances have a higher therapeutic index than morphine, because of their lower toxicity. Higher therapeutic indices than morphine are also shown by 7 and 9.

Compounds 11, 12, 13, 14, 15 and 16 only cancel the withdrawal symptoms of morphine-dependent monkeys in higher doses than the comparison substances, or do not do so at all in tolerated doses. Compounds 12 and 14 also exhibit a stronger analgesic activity than morphine.

Compound 17 also exerts a strong analgesic effect and causes withdrawal symptoms in morphine-dependent monkeys, that is to say the substance is a distinctly active to strongly active morphine-antagonistic agent.

In the case of substances which do not cancel the effect of morphine, previous experience has shown that, a priori, the development of a morphine-like addiction or dependence in man is not to be expected.

Compound 18, because of its low toxicity, has a significantly higher therapeutic index than morphine and the other narcotic analgesics employed for comparison.

Compounds 19, 20, 21, 22, 23 and 24, similarly 17, are distinctly stronger active morphine-antagonistic agents. What has been stated for 17, therefore, applies to them. Of these compounds, 19, 20, 21, 22 and 24 furthermore have a significantly stronger analgesic effect than morphine. Because of their low toxicity, compounds 18 to 24 have a considerably higher therapeutic index than the comparison products.

Compounds 25, 26 and 27 are not morphine-antagonistic agents, but cancel the withdrawal symptoms of morphine-dependent monkeys only at higher doses than the comparison products.

Compound 27 exhibits approximately the same level of analgesic activity as morphine, but has a higher therapeutic index than the latter. Compound 26 also has a higher therapeutic index than morphine and the other analgesics employed for comparison.

SUMMARY

The compounds according to the present invention described in Table 1 were compared with morphine, codeine and pethidine in respect of analgesic effect, toxicity i.e. toleration and addiction-causing properties. They are superior to the comparison products in respect of at least one of these criteria.

TABLE 1

| Substance | Toxicity, rat $LD_{50}$, mg./kg., s.c. | Analgesic effect, heat ray test on the tail of a rat, $ED_{50}$, mg./kg., s.c. | Therapeutic index, $LD_{50}/ED_{50}$ | Morphine substitution effect on morphine dependent monkeys (cancellation of withdrawal symptoms), mg./kg., s.c. | Morphine-antagonistic effect on morphine dependent monkeys (provocation of withdrawal symptoms), mg./kg., s.c. |
|---|---|---|---|---|---|
| Morphine | 105 (65–185) | 1.52 (0.66–2.23) | 69 | From 2,[1] | |
| Codeine | 229 (139–374) | 4.5 (3.6–5.9) | 51 | From 3,[2] / From 12,[1] | |
| Pethidine | 112 (84–136) | 5.7 (3.7–7.3) | 20 | From 1,[2] / From 1.6,[1] | |
| 1 | ~200 | <10 | >20 | From 10,[2] / From 16,[1] | |
| 2 | >250 | ~12 | >21 | Up to 12, insignificant | |
| 3 | 222 (70–663) | ~0.6 | 370 | Up to 18, insignificant | |
| 4 | >250 | ~4 | 63 | Up to 6, insignificant | |
| 5 | >250 | <5 | >50 | From 6,[1] | |
| 6 | >250 | ~10 | >25 | Up to 3, insignificant / From 6,[2] | |
| 7 | >250 | 2.2 (1.7–2.9) | >114 | Up to 6, insignificant / From 12,[2] | |
| 8 | ~280 | 1.1 (0.7–2.9) | 255 | Up to 1, insignificant / From 6.3,[2] | |
| 9 | >250 | ~3 | >83 | From 10,[1] / Up to 6, insignificant | |
| 10 | ~160 | 1.7 (1.1–2.3) | 94 | From 18,[1] / From 6,[1] | |
| 11 | >250 | 6.4 (3.2–11.0) | >39 | Up to 10, insignificant / From 16,[2] | |
| 12 | >250 | ~0.8 | >312 | Up to 6, insignificant / From 12,[2] | |
| 13 | >250 | 3.5 (2.1–5.6) | >72 | From 18,[1] / From 6,[2] | |
| 14 | >250 | ~0.8 | >312 | From 6,[2] / From 12,[1] | |
| 15 | ~220 | 5.7 (0.3–8.4) | 39 | Up to 8, insignificant | |
| 16 | >250 | ~8 | >31 | Up to 6, insignificant | |
| 17 | | 2.9 (0.85–8.3) | | | Up to 0.3, insignificant. From 1,[2]. From 4,[1]. |
| 18 | ~1,800 | <5 | >360 | | From 0.3,[2]. |
| 19 | >500 | 0.43 (0.19–0.88) | >1,160 | | From 0.3,[2]. From 3,[1]. |
| 20 | >250 | ~0.6 | >417 | | From 1,[2]. |
| 21 | ~1,000 | 0.31 (0.16–0.55) | 3,125 | | Do.,[2]. |
| 22 | ~2,250 | 0.58 (0.22–1.29) | ~3,880 | | Up to 0.1, insignificant. From 0.3,[2]. From 5,[2]. |
| 23 | >800 | 2.44 (0.7–10.4) | >328 | | Up to 0.3, insignificant. From 1,[2]. |
| 24 | >250 | 0.54 (0.22–1.3) | >463 | | Up to 0.1, insignificant. From 0.3,[2]. From 3,[1]. |
| 25 | >250 | <5 | >50 | From 6,[1] | |
| 26 | >250 | ~2.5 | >100 | do.,[1] | |
| 27 | >250 | ~1.6 | >156 | do.,[1] | |

[1] Distinct or complete cancellation or provocation.
[2] Slight cancellation or provocation.

TABLE 2
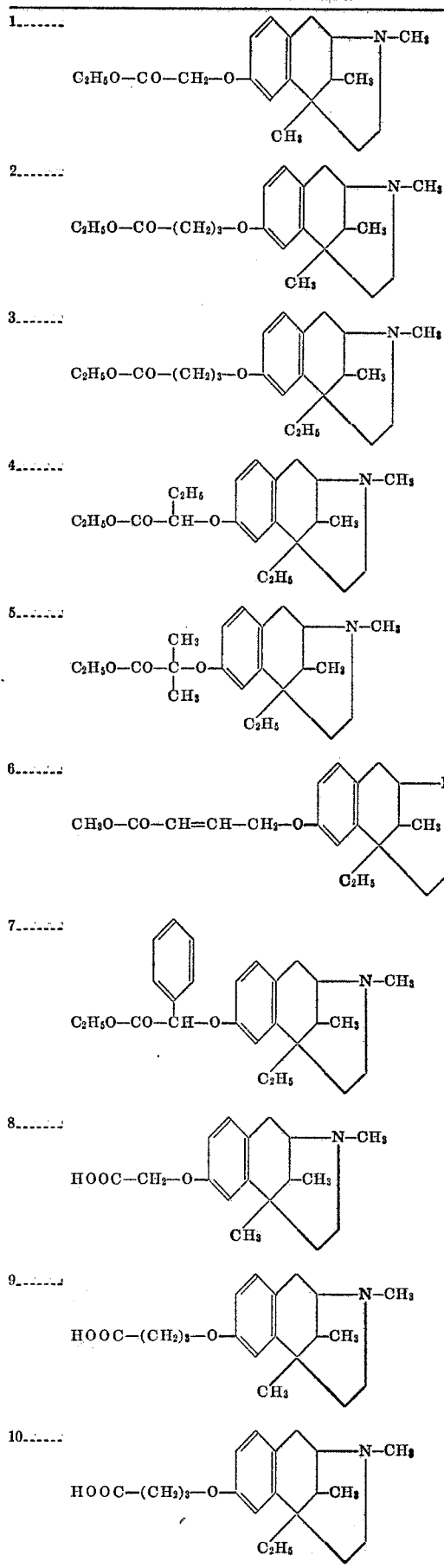

TABLE 2—Continued
11......  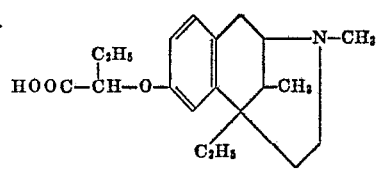
12......  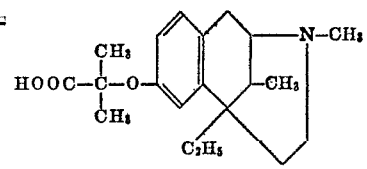
13......  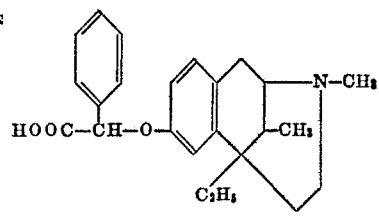
14......  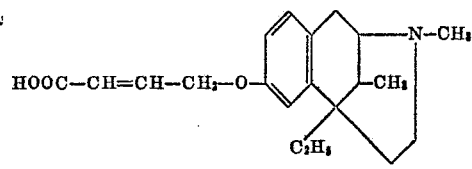
15......  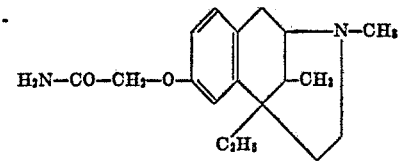
16......  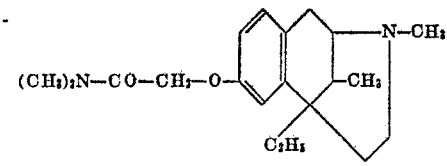
17......  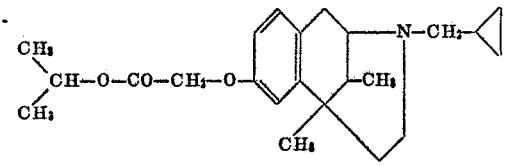
18......  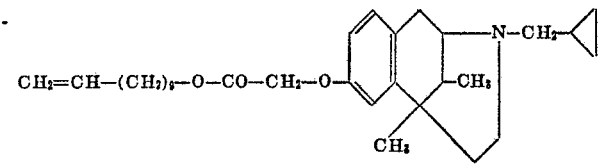
19......  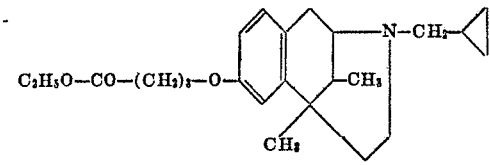
20......  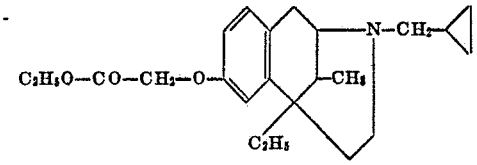

TABLE 2—Continued

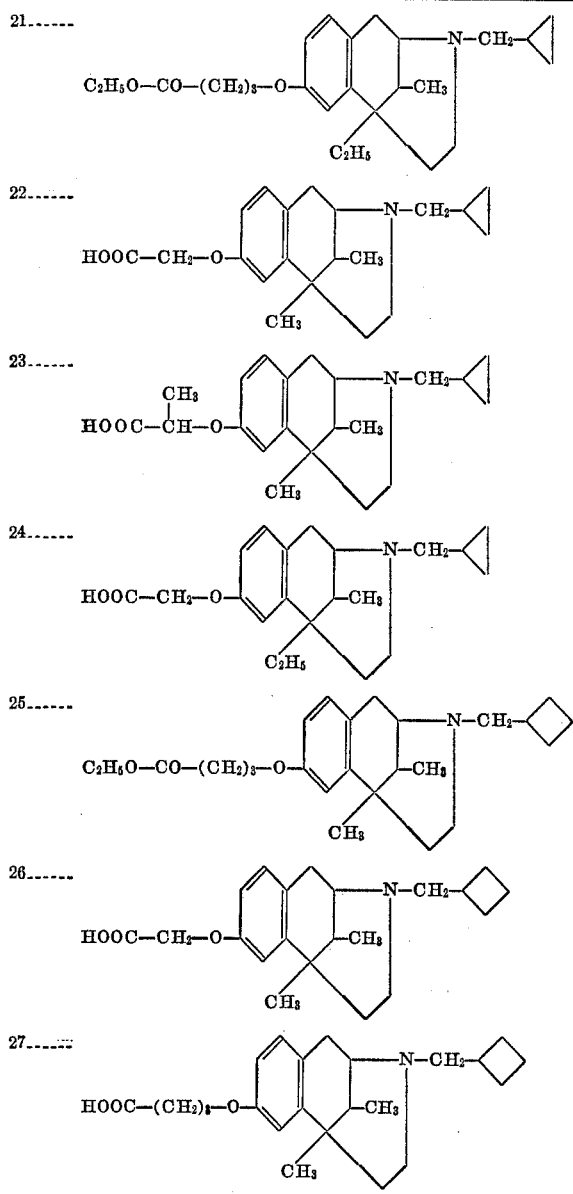

EXAMPLE 1

4.6 g. of 2,5,9-trimethyl-2'-hydroxy-6,7-benzomorphan are suspended in 100 ccs. of absolute methanol, mixed with a solution of 0.46 g. of sodium in 10 ccs. of absolute methanol and heated for one hour under reflux, while stirring. Thereafter the solvent is removed in vacuo. The residue is stirred for ¼ hour with 50 ccs. of absolute benzene, again evaporated to dryness in vacuo, the residue is taken up in 60 ccs. of dimethylformamide, 4.3 g. of γ-bromobutyric acid ethyl ester are added dropwise and the mixture stirred for 18 hours at 60°. The reaction mixture is concentrated in vacuo and distributed between water and ether. After separating off the ether phase, the water phase is extracted twice more with methylene chloride, the combined organic phases are dried by means of sodium sulphate, the solvent is stripped off in vacuo and the residue is distilled in vacuo, whereupon 4.9 g. of 2,5,9-trimethyl-2'-[3-ethoxycarbonylpropoxy-(1)] - 6,7 - benzomorphan of boiling point$_{0.3}$ 192–202° are obtained as a viscous oil.

The same compound is obtained if 4.6 g. of 2,5,9-trimethyl-2'-hydroxy-6,7-benzomorphan and 3.3 g. of sieved potassium hydroxide in 100 ccs. of absolute acetone are heated for 12 hours under reflux, 4.3 g. of γ-bromobutyric acid ethyl ester are added dropwise, the mixture is stirred for a further 12 hours at the boil and filtered, the filtrate concentrated in vacuo and the residue distilled in vacuo.

EXAMPLE 2

4.9 g. of 5-ethyl-2,9-dimethyl-2'-hydroxy-6,7-benzomorphan are dissolved in 100 ccs. of dimethylformamide, mixed with 1.12 g. of powdered potassium hydroxide, and the mixture stirred for 30 minutes at room temperature. A solution of 1.87 g. of chloracetamide in 20 ccs. of dimethylformamide is then added dropwise over the course of 20 minutes and the whole stirred for 12 hours at 70°. The precipitate is filtered off and the filtrate is concentrated in vacuo, whereupon crystallisation occurs. The crystalline product is filtered off and recrystallised from acetone. The 5-ethyl-2,9-dimethyl-2'-carbamoyl-methoxy-6,7-benzomorphan thus obtained contains half a mol of acetone of crystallization and melts at 100° to 102°. The acetone can be removed by drying at 50° in vacuo.

EXAMPLE 3

4.6 g. of 2,5,9-trimethyl-2'-hydroxy-6,7-benzomorphan are converted into the sodium salt in the manner described under Example 1. 100 ccs. of dimethylformamide and 2.6 g. of sodium chloracetate are added and the mixture is warmed slowly to 60° whilst stirring. It is stirred for 12 hours at this temperature, the solvent is removed in vacuo, the residue is taken up in as little water as possible and the solution adjusted to pH 8 by adding hydrochloric acid. The precipitate which forms is filtered off, washed with water and acetone and dried in vacuo. The 2,5,9-trimethyl-2'-carboxymethoxy-6,7-benzomorphan decomposes from 205° onwards.

EXAMPLE 4

9.8 g. of 5-ethyl-2,9-dimethyl-2'-hydroxy-6,7-benzomorphan are suspended in 200 ccs. of absolute methanol, mixed with a solution of 0.92 g. of sodium in 20 ccs. of absolute methanol, and stirred for one hour at the boil. The methanol is distilled off in vacuo, 50 ccs. of absolute benzene are added, the whole is stirred for ¼ hour at room temperature and the solvent is removed in vacuo. The solid residue is dissolved in 120 ccs. of dimethylformamide. After adding 4.6 g. of γ-chlorobutyronitrile, the reaction mixture is warmed for 18 hours to 60°, whilst stirring, and is concentrated in vacuo, and the residue is distributed between water and ether. The undissolved constituents are filtered off. The ether phase is separated off and dried with sodium sulphate. After removal of the ether, the residue is distilled in vacuo and 5-ethyl-2,9-dimethyl-2'-[3-cyanopropoxy-(1)]-6,7 - benzomorphan is obtained as an oil of boiling point$_{0.1}$ 198–204°, which crystallises easily.

5-ethyl-2,9-dimethyl-2'-cyanomethoxy - 6,7 - benzomorphan of boiling point$_{0.1}$ 190–193° is obtained by analogous procedure from 5-ethyl-2,9-dimethyl-2'-hydroxy-6,7-benzomorphan and chloracetonitrile.

EXAMPLE 5

3.9 g. of 2-cyclobutylmethyl-5,9-dimethyl-2'-[3-ethoxycarbonylpropoxy-(1)]-6,7-benzomorphan are dissolved in a mixture of 20 ccs. of absolute ether and 10 ccs. of absolute methanol, mixed with 4.9 ccs. of 2-normal methanolic sodium methylate solution, shaken, and stirred for 12 hours at room temperature after addition of 0.2 cc. of water. The solution is evaporated to dryness in vacuo in a rotary evaporator. The residue consists of the sodium salt of 2-cyclobutylmethyl-5,9-dimethyl-2'-[3-carboxypropoxy-(1)]-6,7-benzomorphan. Colourless powder; decomposition from 225° onwards.

The same compound is obtained if 4.0 g. of 2-cyclobutylmethyl-5.9-dimethyl-2' - [3 -ethoxycarbonylpropoxy-(1)]-6,7-benzomorphan in 50 ccs. of a mixture of 50 ccs. of dioxane and 10 ccs. of water containing 0.4 g. of sodium hydroxide are heated for 4 hours under reflux and subsequently evaporated to dryness.

EXAMPLE 6

5.7 g. of 5-ethyl-2,9-dimethyl-2'-cyanomethoxy-6,7-benzomorphan are dissolved in 30 ccs. of concentrated sulphuric acid and left to stand for 15 hours at room temperature. The mixture is poured onto ice, rendered alkaline with sodium hydroxide solution whilst cooling and extracted with benzene-butanol (1:1), the extract is dried by means of sodium sulphate, the solvent is removed in vacuo and the residue is recrystallised from acetone. The resulting product is identical with the 5-ethyl-2,9-dimethyl-2'-carbamoylmethoxy-6,7-benzomorhpan described in Example 2.

EXAMPLE 7

5.7 g. of 5-ethyl-2,9-dimethyl-2'-cyanomethoxy-6,7-benzomorphan in 50 ccs. of concentrated hydrochloric acid are stirred for 12 hours under reflux. The mixture is subsequently evaporated to dryness, the residue is taken up in water, and a solution of 2.4 g. of sodium hydroxide in water is added. After evaporation, a solid residue is obtained, which is treated with absolute ethanol. The sodium chloride is removed by filtration, the filtrate is again evaporated to dryness, the residue is triturated with absolute ethanol, and the product is filtered off and dried in vacuo. The sodium salt of 5-ethyl-2,9-dimethyl - 2' - carboxymethoxy-6,7-benzomorphan, which is thus obtained, decomposes from 193° onwards.

The same compound is obtained if 5-ethyl-2,9-dimethyl-2'-carbamoylmethoxy-6,7-benzomorphan is employed in place of 5-ethyl-2,9-dimethyl-2'-cyanomethoxy-6,7-benzomorphan in the reaction described above.

EXAMPLE 8

A solution of 3.8 g. of 2-cyclopropylmethyl-5,9-dimethyl-2'-[ethoxycarbonylpropoxy-(1)] - 6,7 - benzomorphan in 100 ccs. of ethanol is saturated with ammonia and heated for several hours to 80–100° in an autoclave. After evaporation, 2-cyclopropylmethyl-5,9-dimethyl-2'-[3-carbamoylpropoxy-(1)] - 6,7-benzomorphan is obtained. Melting point of the hydrochloride, 176–179°.

EXAMPLE 9

5.0 g. of 2,5,9-trimethyl-2'-carboxymethoxy-6,7-benzomorphan are dissolved in 100 ccs. of absolute ethanol and stirred for 3 hours under reflux, while passing in hydrogen chloride. Thereafter the mitxure is evaporated to dryness, the residue is taken up in 100 ccs. of absolute ethanol and the mixture is again heated to the boil for 3 hours while passing in hydrogen chloride. After removal of the solvent in vacuo, the residue is dissolved in a little water, and the solution is rendered alkaline with dilute sodium hydroxide solution whilst cooling and is extracted three times with methylene chloride-ether. The combined extracts are dried by means of sodium sulphate, concentrated and acidified with a solution of tartaric acid in ether, whereupon the tartrate of 2,5,9-trimethyl-2'-ethoxycarbonylmethoxy-6,7-benzomorphan precipitates. metling point 120°.

EXAMPLE 10

1.5 g. of hydrogen chloride are passed into a solution of 5.7 g. of 5-ethyl-2,9-dimethyl-2'-cyanomethoxy-6,7-benzomorphan in 30 ccs. of absolute ethanol, while cooling. The reaction mixture is left to stand for two hours at room temperature and is evaporated to dryness in vacuo. The residue is taken up in water, and the solution is stirred for 10 minutes, covered with a layer of ether and rendered alkaline with dilute sodium hydroxide solution while cooling. After separating off the ether phase, the aqueous phase is extracted twice more with ether. The combined ether solutions are dried with sodium sulphate, concentrated, and the residue distilled in vacuo. 5-ethyl-2,9-dimethyl - 2' - ethoxycarbonylmethoxy-6,7-benzomorphan boils at 176–180°/0.1 mm. Hg.

EXAMPLE 11

6.5 g. of the sodium salt of 5-ethyl-2,9-dimethyl-2'-carboxymethoxy-6,7-benzomorphan are introduced into 100 ccs. of dry ethylene chloride, 1.5 g. of hydrogen chloride are then passed in while stirring and cooling, the mixture is allowed to warm to room temperature, 3.6 g. of thionyl chloride are added and the whole is heated under reflux until the evolution of gas has ended and is evaporated to dryness in vacuo. The residue is taken up in 100 ccs. of dry ethylene chloride and 3.0 g. of dimethylamine are passed in whilst cooling. After 15 minutes' stirring at room temperature, 50 ccs. of 4-normal sodium hydroxide solution are added, and the ethylene chloride phase is separated off, dried by means of sodium sulphate and evaporated to dryness in vacuo. The residue is taken up in acetone and rendered acid with a solution of hydrochloric acid in ether. On further addition of ether, the hydrochloride of 5-ethyl-2,9-dimethyl-2'-N,N-dimethylcarbamoylmethoxy - 6,7 - benzomorphan precipitates. Melting point 206–208°.

The same compound is obtained if 5-ethyl-2,9-dimethyl-2'-hydroxy-6,7-benzomorphan is reacted with chloracetic acid dimethylamide in the manner described under Example 2.

The following compounds are produced in a manner analogous to the preceding examples.

2,5,9-trimethyl-2'-(α-ethoxycarbonyl - p - methylbenzyloxy)-6,7-benzomorphan, boiling point $_{0.1}$ 210 to 212° C.

2,5,9-trimethyl-2'-(α-ethoxycarbonyl - p - chlorobenzyloxy)-6,7-benzomorphan, boiling point $_{0.15}$ 215 to 218° C.

2,5,9-trimethyl-2'-(α-ethoxycarbonyl - p - nitrobenzyloxy)-6,7-benzomorphan, decomposition of the hydrochloride from 167° C. onwards.

2,5,9-trimethyl-2'-(α-ethoxycarbonyl - p-methoxybenzyloxy)-6,7-benzomorphan, decomposition of the hydrochloride from 134° C. onwards.

2,5,9-trimethyl-2'-(α-ethoxycarbonyl - p - acetamidobenzyloxy)-6,7-benzomorphan, decomposition of the hydrochloride from 158° C. onwards.

2,5,9-trimethyl-2'-[3-carboxypropoxy-(1)] - 6,7 - benzomorphan, melting point of the sodium salt 144° C.

2,5,9-trimethyl-2'-(α-carboxy - p - methoxybenzyloxy)-6,7-benzomorphan, decomposition of the sodium salt from 176° C. onwards.

2,5,9-trimethyl-2'-(α-carboxy - p-chlorobenzoyloxy)-6,7-benzomorphan, decomposition of the sodium salt from 205° C. onwards.

5-ethyl-2,9-dimethyl-2'-[3-ethoxycarbonylpropoxy - (1)]-6,7-benzomorphan, boiling point $_{0.2}$ 202 to 206° C.

5-ethyl-2,9-dimethyl-2'-[1-ethoxycarbonylpropoxy - (1)]-6,7-benzomorphan, boiling point $_{0.3}$ 206 to 212° C.

5-ethyl-2,9-dimethyl-2'-[2-ethoxycarbonylpropoxy - (2)]-6,7-benzomorphan, boiling point $_{0.1}$ 180 to 182° C.

5-ethyl-2,9-dimethyl-2'-(3-methoxycarbonylprop - 2-en-1-yloxy)-6,7-benzomorphan, boiling point $_{0.15}$ 194 to 202° C.

5-ethyl-2,9-dimethyl - 2'-[10 - ethoxycarbonyldecyloxy)-(1)]-6,7-benzomorphan, purified by Craig distribution; oil. Calculated: N 3.06. Found: N 3.00.

5-ethyl-2,9-dimethyl-2'-(α - ethoxycarbonylbenzyloxy)-6,7-benzomorphan, decomposition of the hydrochloride from 80° C. onwards.

5-ethyl-2,9-dimethyl-2'-[3 - carboxypropoxy - (1)]-6,7-benzomorphan, decomposition of the sodium salt from 208° C. onwards.

5-ethyl-2,9-dimethyl-2'-[1 - carboxypropoxy - (1)]-6,7-benzomorphan, decomposition of the sodium salt from 90° C. onwards.

5-ethyl-2,9-dimethyl-2'-[2 - carboxypropoxy - (2)]-6,7-benzomorphan, decomposition of the monohydrate of the sodium salt from 248° C. onwards.

5-ethyl-2,9-dimethyl-2'-(α - carboxybenzyloxy)-6,7-benzomorphan, decomposition of the dihydrate of the sodium salt from 216° C. onwards.

5-ethyl-2,9-dimethyl-2'-(3 - carboxyprop-2-en-1-yloxy)-6,7-benzomorphan, decomposition of the monohydrate of the sodium salt from 225° C. onwards.

5-ethyl-2,9 - dimethyl-2'-[1 - piperidinocarbonylethoxy-(1)]-6,7-benzomorphan, hydrochloride $x$H$_2$O: decomposition from 80° C. onwards.

2 - cyclopropylmethyl - 5,9 - dimethyl-2'-isopropoxycarbonylmethoxy-6,7-benzomorphan, boiling point $_{0.1}$ 188 to 192° C.

2 - cyclopropylmethyl - 5,9 - dimethyl-2'-(undec-10-en-1-yl - oxycarbonylmethoxy)-6,7-benzomorphan, melting point of the hydrochloride 138 to 142° C.

2 - cyclopropylmethyl - 5,9 - dimethyl-2'-[3-ethoxycarbonylpropoxy(1)]-6,7-benzomorphan, boiling point $_{0.15}$ 204 to 212° C.

2 - cyclopropylmethyl - 5,9 - dimethyl-2'-ethoxycarbonylmethoxy-6,7-benzomorphan boiling point $_{0.15}$ 194 to 198° C.

2 - cyclopropylmethyl - 5,9 - dimethyl-2'-[1-ethoxycarbonylethoxy(1)]-6,7-benzomorphan, boiling point $_{0.09}$ 170 to 178° C.

2 - cyclopropylmethyl - 5,9 - dimethyl-2'-(α-ethoxycarbonyl-p-nitrobenzyloxy)-6,7-benzomorphan, melting point of the hydrochloride 127 to 129° C. (decomposition).

2 - cyclopropylmethyl - 5,9 - dimethyl-2'-(α-ethoxycarbonyl-p-chlorobenzyloxy)-6,7-benzomorphan, boiling point $_{0.15}$ 223 to 226° C.

2 - cyclopropylmethyl - 5,9 - dimethyl-2'-(α-ethoxycarbonyl-p-methylbenzyloxy)-6,7-benzomorphan, boiling point $_{0.1}$ 213 to 218° C.

2 - cyclopropylmethyl - 5,9 - dimethyl-2'-(α-ethoxycarbonyl-p-methoxybenzyloxy)-6,7-benzomorphan, boiling point $_{0.15}$ 220 to 223° C.

2 - cyclopropylmethyl - 5,9 - dimethyl-2'-carboxymethoxy-6,7-benzomorphan, decomposition of the hemihydrate of the sodium salt from 192° C. onwards.

2 - cyclopropylmethyl - 5,9 - dimethyl-2'-[1-carboxyethoxy-(1)]-6,7-benzomorphan, decomposition of the monohydrate of the sodium salt from 183° C. onwards.

2 - cyclopropylmethyl - 5,9 - dimethyl - 2' - [3-carboxypropoxy-(1)]-6,7-benzomorphan, decomposition of the sodium salt from 110° C. onwards.

2 - cyclopropylmethyl - 5,9 - dimethyl-2'-[3-N,N-dimethylcarbamoylpropoxy-(1)] - 6,7 - benzomorphan, boiling point $_{0.03}$ 224 to 232° C.

2 - cyclopropylmethyl - 5 - ethyl - 9 - methyl-2'-[3-ethoxycarbonylpropoxy - (1)] - 6,7 - benzomorphan, boiling point $_{0.25}$ 202 to 210° C.

2 - cyclopropylmethyl - 5 - ethyl - 9 - methyl-2'-ethoxycarbonylmethoxy-6,7-benzomorphan, melting point of the hydrochloride 180 to 182° C.

2 - cyclopropylmethyl - 5 - ethyl - 9 - methyl-2'-α-ethoxycarbonylbenzyloxy-6,7-benzomorphan, boiling point $_{0.1}$ 225 to 228° C.

2 - cyclopropylmethyl - 5 - ethyl - 9 - methyl-2'-[2-ethoxycarbonylpropoxy - (2)] - 6,7 - benzomorphan, boiling point $_{0.15}$ 174 to 184° C.

2 - cyclopropylmethyl - 5 - ethyl - 9 - methyl-2'-[10-ethoxycarbonyldecyloxy-(1)]-6,7-benzomorphan, melting point of the hydrochloride 118 to 121° C.

2 - cyclopropylmethyl - 5 - ethyl - 9 - methyl-2'-(3-methoxycarbonyl-prop-2-en-1-yloxy) - 6,7-benzomorphan, boiling point $_{0.2}$ 203 to 210° C.

2 - cyclopropylmethyl - 5 - ethyl - 9 - methyl-2'-carboxymethoxy-6,7-benzomorphan, decomposition of the sodium salt from 110° C. onwards.

2 - cyclopropylmethyl - 5 - ethyl - 9 - methyl-2'-[2-carboxypropoxy-(2)]-6,7-benzomorphan, decomposition of the sodium salt from 75° C. onwards.

2 - cyclobutylmethyl - 5,9 - dimethyl-2'-[3-ethoxycarbonylpropoxy-(1)]-6,7-benzomorphan, boiling point $_{0.9}$ 232 to 236° C.

2 - cyclobutylmethyl - 5,9 - dimethyl-2'-ethoxycarbonylmethoxy-6,7-benzomorphan, boiling point $_{0.09}$ 210 to 214° C.

2 - cyclobutylmethyl - 5,9 - dimethyl-2'-carboxymethoxy-6,7-benzomorphan, decomposition of the monohydrate of the sodium salt from 180° C. onwards.

What is claimed is:
1. A benzomorphan of the formula:

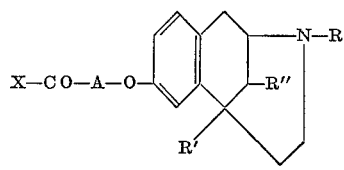

wherein
R is methyl, cyclopropylmethyl or cyclobutylmethyl;
R' and R" are the same or different, and are methyl or ethyl;
A is straight or branched chain alkylene or alkylidene of 1 to 4 carbon atoms or alkenylene of 2 to 4 carbon atoms, unsubstituted or substituted by phenyl or phenyl substituted by methyl, methoxy, chloro, nitro or acetylamino;

X is OH, OR''', of 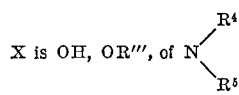

wherein

R''' is a straight or branched chain alkyl of 1 to 11 carbon atoms, or straight or branched chain alkenyl of 2 to 11 carbon atoms, and $R^4$ and $R^5$ are the same or different, and are hydrogen, alkyl of 1 to 4 carbon atoms, or $R^4$ and $R^5$ together with the nitrogen atom form a pyrrolidine, piperidine or morpholine ring, or a pharmaceutically acceptable non-toxic salt thereof.

2. A compound according to claim 1 wherein R''' is straight or branched chain alkyl of 1 to 3 carbon atoms or straight or branched chain alkenyl of 2 or 3 carbon atoms, $R^4$ and $R^5$ are the same or different, and are hydrogen or alkyl of 1 or 2 carbon atom, or $R^4$ and $R^5$ together with the nitrogen atom form a piperidine ring.

3. A compound according to claim 1 wherein $R^4$ and $R^5$ are methyl.

4. The compound according to claim 1 which is 5-ethyl - 2,9 - dimethyl-2'-[3-ethoxycarbonylpropoxy-(1)]-6,7-benzomorphan.

5. The compound according to claim 1 which is 2-cyclopropylmethyl-5,9-dimethyl - 2' - [3-ethoxycarbonylpropoxy-(1)]-6,7-benzomorphan.

6. The compound according to claim 1 which is 2-cyclopropylmethyl - 5 - ethyl - 9-methyl-2'-[3-ethoxycarbonylpropoxy-(1)]-6,7-benzomorphan.

7. The compound according to claim 1 which is 2-cyclopropylmethyl-5,9-dimethyl - 2' - carboxymethoxy-6,7-benzomorphan.

8. The compound according to claim 1 which is 2-cyclobutylmethyl - 5,9 - dimethyl-2'-[3-ethoxycarbonylpropoxy-(1)]-6,7-benzomorphan.

9. The compound according to claim 1 which is 2-cyclobutylmethyl - 5,9 - dimethyl-2'-[3-carboxypropoxy-(1)]-6,7-benzomorphan.

References Cited

UNITED STATES PATENTS 3,322,778   5/1967   Kupchan et al. ____ 260—294.7
3,345,373  10/1967   Gordon et al. _____ 260—294

OTHER REFERENCES

Morrison et al. "Organic Chemistry," 2nd edition, Allyn and Bacon, Inc., Boston, Mass. (1966), pp. 562–6.

HENRY R. JILES, Primary Examiner

G. T. TODD, Assistant Examiner

U.S. Cl. X.R.

260—240 R, 247.2 A, 247.5 R, Dig. 13; 424—267